United States Patent
Nami et al.

(10) Patent No.: US 9,929,634 B2
(45) Date of Patent: Mar. 27, 2018

(54) SWITCHING CELL, A SWITCHING MODULE FOR A CHAIN LINK, AND A CHAIN LINK FOR A MULTILEVEL CONVERTER

(71) Applicant: ABB Schweiz AG, Baden (CH)

(72) Inventors: Alireza Nami, Västerås (SE); Christopher Townsend, Newcastle (AU)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/502,373

(22) PCT Filed: Aug. 8, 2014

(86) PCT No.: PCT/EP2014/067100
§ 371 (c)(1),
(2) Date: Feb. 7, 2017

(87) PCT Pub. No.: WO2016/020016
PCT Pub. Date: Feb. 11, 2016

(65) Prior Publication Data
US 2017/0237330 A1   Aug. 17, 2017

(51) Int. Cl.
*H02J 7/00* (2006.01)
*G05F 1/10* (2006.01)
(Continued)

(52) U.S. Cl.
CPC ...... *H02M 1/08* (2013.01); *H02M 2001/0054* (2013.01)

(58) Field of Classification Search
CPC ................................ H02M 3/07; H02M 3/073
(Continued)

(56) References Cited

U.S. PATENT DOCUMENTS 5,473,526 A * 12/1995 Svensson ................. G05F 1/565
                                                                307/109
7,105,948 B2 * 9/2006 Steimer ................... H02J 3/1814
                                                                307/103
(Continued)

FOREIGN PATENT DOCUMENTS

DE        102 17 889 A1     11/2003
WO   WO 2013/186006 A2     11/2003

OTHER PUBLICATIONS

Nami et al., "A new T-type NPC-based submodule for Modular Multilevel Cascaded Converters", the 5th Power Electronics, Drive Systems and Technologies Conference (PEDSTC 2014), Feb. 5-6, 2014, XP032587014, pp. 137-142, Figure 1.
(Continued)

*Primary Examiner* — Gary Nash
(74) *Attorney, Agent, or Firm* — Birch, Stewart, Kolasch & Birch, LLP

(57) ABSTRACT

A switching cell for a chain link includes a first side including a first terminal and a second terminal, a second side including a third terminal and a fourth terminal, a first switching unit, a second switching unit, and a first and a second capacitor unit. The first terminal is connected to the second terminal via the first capacitor unit. The first capacitor unit has its positive side facing the first terminal. The third terminal is connected to the fourth terminal via the second capacitor unit. The second capacitor has its positive side facing the fourth terminal. The second terminal is connected to the fourth terminal via the second switching unit. The switching cell also includes a third capacitor unit, and the first terminal is connected to the third terminal via a first series connection including the first switching unit and the third capacitor unit. The third capacitor unit has its positive side facing the third terminal. A switching module includes at least one such switching cell. The switching
(Continued)

module can include at least two such switching cells, wherein the first switching cell and the second switching cell are connected in series in opposing directions, and wherein the second side of the first switching cell is connected to the second side of the second switching cell. A chain link including a number of switching modules in serial connection is also provided.

20 Claims, 6 Drawing Sheets

(51) Int. Cl.
| | | |
|---|---|---|
| *G05F 3/02* | (2006.01) | |
| *H02M 3/18* | (2006.01) | |
| *H02M 7/00* | (2006.01) | |
| *H02M 1/08* | (2006.01) | |
| *H02M 1/00* | (2006.01) | |

(58) Field of Classification Search
USPC ..... 363/59–61, 123, 124; 320/116–121, 124; 327/536
See application file for complete search history.

(56) References Cited

U.S. PATENT DOCUMENTS

| | | | | |
|---|---|---|---|---|
| 7,817,451 B2* | 10/2010 | Barbosa | ............ | H02M 7/483 |
| | | | | 363/131 |
| 2003/0151448 A1* | 8/2003 | Fujiyama | ............ | H02M 3/07 |
| | | | | 327/536 |
| 2005/0083716 A1 | 4/2005 | Marquardt | | |
| 2007/0025126 A1* | 2/2007 | Barbosa | ............ | H02M 7/483 |
| | | | | 363/60 |
| 2008/0150621 A1* | 6/2008 | Lesso | ............ | H02M 3/07 |
| | | | | 327/536 |
| 2008/0231347 A1* | 9/2008 | Yen | ............ | H02M 3/07 |
| | | | | 327/536 |
| 2009/0231896 A1* | 9/2009 | Barbosa | ............ | H02M 7/49 |
| | | | | 363/131 |

OTHER PUBLICATIONS

Nami et al., "Five level cross connected cell for cascaded converters", 2013 15th European Conference on Power Electronics and Applications ( EPE) , IEEE, Sep. 2, 2013, XP032505608, pp. 1-9, Figure 3.

Nami et al., "Modular Multilevel Converters for HVDC Applications: Review on Converter Cells and Functionalities", IEEE Transactions on Power Electronics, Jan. 2015, vol. 30, No. 1, XP011557523, pp. 18-36, the whole document.

Peng et al., "Recent Advances in Multilevel Converter/Inverter Topologies and Applications", the 2010 International Power Electronics Conference: IPEC-SAPPORO 2010, Jun. 21, 2010, XP031729761, pp. 492-501, Figure 6c, paragraph [0lll].

* cited by examiner

SWITCHING CELL, A SWITCHING MODULE FOR A CHAIN LINK, AND A CHAIN LINK FOR A MULTILEVEL CONVERTER

TECHNICAL FIELD

The invention relates to a switching module for a chain link, which switching module comprises at least one switching cell comprising switching units, capacitor units and terminals.

The invention also relates to chain link converters, and especially to a chain link for a converter, which chain link comprises at least two switching modules linked in a chain, the switching modules are configured for serial connection into a multilevel chain link.

BACKGROUND AND PRIOR ART

Multilevel chain link converters are used in many high power applications. In particular, modular converters, where a number of switching cells, each including a number of switching elements, or switching units, and an energy storing element in the form of a DC capacitor, are connected in series in a chain link to form a variable voltage source, have found increased use. These modular converters are used in HVDC (High Voltage Direct Current) and FACTS (Flexible Alternating Current Transmission Systems) applications.

A commonly used modular converter consists of serially connected full-bridge switching cells, each switching cell comprising four switching units, in the form of semiconductor switches, for example IGBTs (Insulated-Gate Bipolar Transistor) or IGCTs (Integrated Gate-Commutated Thyristor), and one DC capacitor unit.

The losses in semiconductor switches is dependent on both the switching of, as well as the conduction by, the switches. In many FACTS converters, the conduction losses have a greater impact on total loss than the switching losses.

Semiconductor switches having higher voltages can be used in full-bridge converters to reduce the number of switching cells in order to reduce the conduction losses. However, reducing the number of switching levels reduces the available number of intermediate voltage levels. Thus, a trade-off will be made between harmonic performance of the converter and the switching frequency of the switches. In for example FACTS applications comprising full-bridge converters, it is difficult to reduce the number of switching cells beyond a certain point without negatively affecting the harmonic requirements so that the harmonic requirements of the power system cannot be met.

WO 2013/186006 describes an alternative to full-bridge switching cells, wherein the number of switching units are reduced for a converter having the equal number of switching levels. The number of switching units, for each capacitor of the converter, is half compared to the number of switches in a converter with full-bridge switching cells. For a five-level chain link, the number of switching units in the conduction path is three compared to four switching units in a full-bridge converter. Using the chain link described in WO 2013/186006, it is therefore possible to reduce the conduction losses in comparison to converters with full-bridge switching cells.

The paper "Five level cross connected cell for cascaded converters", by Alireza Nami, Liwei Wang, Frans Dijkhuizen, presented at EPE, Lille, France, Sep. 3, 2013 (Nami et al) describes the same type of five level four quadrant multilevel converter cell configuration as in WO 2013/186006. Nami et al points out that a purpose of this cell configuration is to reduce costs and losses in a multilevel converter, by providing a large number of voltage levels with a low number of devices. The five-level four quadrant cell configuration of Nami et al is suitable for HVDC and FACTS converters and is depicted in FIG. 12. The switching cell has two half-bridges (the output switches S1, S2 and the input switches S3, S4, respectively), two switching units S5, S6, and two capacitors C1, C2, each cell half having one capacitor, wherein the cell halves are cross connected to each other, by means of the switching units S5, S6.

The chain link of Nami et al and WO 2013/186006 provides a way to reduce the number of switching units in the conduction path, and thereby reduce losses. However, there is still a need to reduce the losses even further, without lowering the quality in terms of harmonic performance of the chain-link converters

SUMMARY OF INVENTION

For these purposes, the present invention provides a switching module for a chain link.

An aim of the invention is to reduce the number of switching units, still providing a comparatively large number of voltage levels in the output.

In a first aspect, the invention provides a switching module for a chain link comprising at least one switching cell. Each switching cell comprises a first side comprising a first terminal and a second terminal and a second side comprising a third terminal and a fourth terminal. Each switching cell comprises a first switching unit, a second switching unit, and a first and a second capacitor unit. The first terminal is connected to the second terminal via the first capacitor unit, wherein the first capacitor unit has its positive side facing the first terminal. The third terminal is connected to the fourth terminal via the second capacitor unit, wherein the second capacitor has its positive side facing the fourth terminal. The second terminal is connected to the fourth terminal via the second switching unit. Especially, each switching cell comprises a third capacitor unit, wherein:

the first terminal is connected to the third terminal via a first series connection comprising the first switching unit and the third capacitor unit, wherein the third capacitor unit has its positive side facing the third terminal.

Thus, the switching module can be provided as a single switching cell. However, it is preferred to provide switching modules that comprise two identical switching cells connected to each other, wherein the two switching cells are arranged in opposite directions.

In a preferred embodiment, the switching module comprises at least two switching cells, preferably one pair of identical switching cells, wherein the first switching cell and a second switching cell are connected in series in opposing directions, wherein the second side of the first switching cell is connected to the second side of the second switching cell.

This provides switching modules, each consisting of two switching cells, which switching modules are suitable for linking to further switching modules into a chain link. Preferably, such a chain link of at least one switching module comprises an input and an output comprising a respective half-bridge of semiconductor switches.

In an alternative embodiment, the switching cells are interconnected by means of their first sides.

In a first further embodiment (to the preferred embodiment), the first switching cell and the second switching cell are interconnected only by means of the fourth terminal of the first switching cell being directly connected to the fourth terminal of the second switching cell.

In a second further embodiment, the first switching cell and the second switching cell are interconnected only by means of the third terminal of the first switching cell being directly connected to the third terminal of the second switching cell.

In a third further embodiment the first switching cell and the second switching cell are interconnected by means of the fourth terminal of the first switching cell being directly connected to the fourth terminal of the second switching cell, and the first switching cell and the second switching cell are also interconnected by means of the third terminal of the first switching cell being directly connected to the third terminal of the second switching cell.

In a fourth further embodiment the first switching cell and the second switching cell are interconnected only by means of the third terminal of the first switching cell being directly connected to the fourth terminal of the second switching cell.

In a second aspect, the present invention provides a multilevel chain link for providing the voltage levels of each phase leg of a converter.

The chain link comprises an input have two switching units in a half-bridge configuration, an output comprising two switching units in a half-bridge configuration and a number of switching modules arranged in series between the input and the output. Each switching module comprises two switching cells, preferably one pair of identical switching cells, wherein the first switching cell and a second switching cell are connected in series in opposing directions, wherein the second side of the first switching cell is connected to the second side of the second switching cell, wherein each switching cell being made in accordance with the switching cell of the first aspect of the invention.

In a first embodiment of the second aspect, the first switching cell and the second switching cell of each switching module are interconnected only by means of the fourth terminal of the first switching cell and the fourth terminal of the second switching cell.

In a further embodiment of the first embodiment of the second aspect, every first switching module in every pair of consecutive switching modules is connected to the other switching module of the pair of consecutive switching modules only by means of the second terminal of the second switching cell of the first switching module being connected to the second terminal of the first switching cell of the other switching module.

In an alternative to this further embodiment, consecutive switching modules are interconnected by means of respective first terminals, instead of respective second terminals.

In a second embodiment of the second aspect, the first switching cell and the second switching cell of each switching module (SM$_1$, are interconnected only by means of the third terminal of the first switching cell and the third terminal of the second switching cell.

In a further embodiment of the second embodiment of the second aspect, every first switching module in every pair of consecutive switching modules is connected to the other switching module of the pair of consecutive switching modules only by means of the first terminal of the second switching cell of the first switching module being connected to the first terminal of the first switching cell of the other switching module.

In an alternative to this further embodiment, consecutive switching modules are interconnected by means of respective second terminals, instead of respective first terminals.

In a third embodiment of the second aspect, the first switching cell and the second switching cell of each switching module are interconnected only by means of the third terminal of the first switching cell and the fourth terminal of the second switching cell.

In a further embodiment of the third embodiment of the second aspect, every first switching module in every pair of consecutive switching modules is connected to the other switching module of the pair of consecutive switching modules only by means of the first terminal of the second switching cell of the first switching module being connected to the second terminal of the first switching cell of the other switching module.

In a fourth embodiment of the second aspect, the first switching cell and the second switching cell of each switching module are interconnected by means of:
 the fourth terminal of the first switching cell being connected to the fourth terminal of the second switching cell, and
 the third terminal of the first switching cell being connected to the third terminal of the second switching cell.

In a further embodiment of the fourth embodiment of the second aspect, every first switching module in every pair of consecutive switching modules is connected to the other switching module of the pair of consecutive switching modules by means of:
 the first terminal of the second switching cell of the first switching module being connected to the first terminal of the first switching cell of the other switching module, and
 the second terminal of the second switching cell of the first switching module being connected to the second terminal of the first switching cell of the other switching module.

In a third aspect, the invention provides a switching module that is a variant to the second further embodiment of the first aspect, by providing a switching module comprising a first switching cell and a second switching cell. In this switching module, each switching cell comprises:
 a first side comprising a first terminal and a second terminal, a second side comprising a third terminal, a first switching unit, a second switching unit, and a first capacitor unit and a second capacitor unit, wherein
 the first terminal is connected to the second terminal via the first capacitor unit, wherein the first capacitor unit has its positive side facing the first terminal. The switching module of the third aspect is characterized by each switching cell comprising a third capacitor unit, wherein:
 the first terminal is connected to the third terminal via a first series connection comprising the first switching unit and the third capacitor unit, wherein the third capacitor unit has its positive side facing the third terminal,
 the second terminal is connected to the third terminal via the second switching unit and the second capacitor unit, wherein the second switching unit and the second capacitor unit are connected in a second series connection. The switching module is further characterized in that the first switching cell and the second switching cell are interconnected by means of the third terminal of the first switching cell and the third terminal of the second switching cell.

In a forth aspect, the invention provides a switching module that is a variant to the third further embodiment of the first aspect, by providing a switching module that comprises a first switching cell and a second switching cell, wherein each switching cell comprises:
- a first side comprising a first terminal and a second terminal, a second side comprising a third terminal, a first switching unit, a second switching unit, and a first capacitor unit and a second capacitor unit, wherein
- the first terminal is connected to the second terminal via the first capacitor unit, wherein the first capacitor unit has its positive side facing the first terminal. The switching module of the forth aspect is characterized in that in each switching cell:
- the second capacitor unit has its positive side facing the third terminal;
- the second capacitor unit provides twice the voltage level as the first capacitor unit;
- the first terminal is connected to the third terminal via a first series connection comprising the first switching unit and the second capacitor unit, wherein the second capacitor unit has its positive side facing the third terminal; and
- the second terminal is connected to the third terminal via the second switching unit. The switching module is further characterized in that the first switching cell and the second switching cell are interconnected by means of the third terminal of the first switching cell being connected to the third terminal of the second switching cell.

Please note that the third terminal referred to in this forth aspect corresponds to the fourth terminal referred to in the first, second and the third aspect of the invention. However, since there are only three terminals used according to the forth aspect, the terminals has been numbered the "first", the "second" and the "third" terminal, so as to avoid confusion by referring to the three terminals as the "first", the "second" and the "fourth" terminal.

BRIEF DESCRIPTION OF THE DRAWINGS

Embodiments of the invention will be described with references to the accompanying drawings wherein.

DETAILED DESCRIPTION OF EMBODIMENTS

Figure 1:
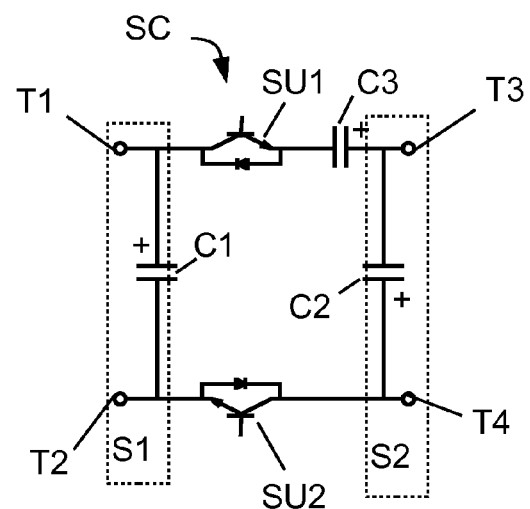
FIG. 1 illustrates a switching cell in accordance with the invention that can be used as a building block for a chain link.

FIG. 1 illustrates a switching cell SC that forms a building block for a chain link converter. The switching module SM of the invention comprises at least one such switching cell SC. However, the switching modules SM illustrated in FIGS. 2-6 comprises two such identical switching cells SC, which are arranged and interconnected in a pair of switching cells SC. Switching modules SM comprising two identical switching cells are preferred building blocks for a multilevel chain link converter.

The switching cell SC in FIG. 1 has a first side S1 and a second side S2, and comprises a first terminal T1, a second terminal T2, a third terminal T3 and a fourth terminal T4. The first terminal T1 and the second terminal T2 are arranged in the first side S1, whereas the third terminal T3 and the fourth terminal T4 are arranged in the second side S2. A respective capacitor unit C1, C2 is are arranged between the terminals T1, T2, T3, and T4 of each side S1, S2. Thus, the first terminal T1 is connected to the second terminal T2 via a first capacitor unit C1, whereas the third terminal T3 is connected to the fourth terminal T4 via a second capacitor unit C2. The first capacitor unit C1 has its positive side facing towards the first terminal T1. The second capacitor unit CU2 has its positive side facing towards the fourth terminal T4.

The first side S1 and the second side S2 are interconnected by means of two connections. A first connection between the first terminal T1 and the third terminal T3, which first connection comprises a first switching unit SU1 and a third capacitor unit C3, so that the first terminal T1 is connected to the third terminal T3 via the first switching unit SU1 and the third capacitor unit C3, wherein the first switching unit SU1 and the third capacitor unit C3 are arranged in series. The third capacitor unit C3 has its positive side facing in the direction towards the third terminal T3. A second connection connects the second terminal T2 to the fourth terminal, which second connection comprises a second switching unit SU2. Thus, the second terminal T2 is connected to the fourth terminal T4 via the second switching unit SU2. The switching cell SC provides a circuit with three capacitor units C1, C2, C3 in a loop.

Each switching unit SU1, SU2, comprises a semiconductor switch in anti-parallel configuration with a diode, e.g. each switching unit SU1, SU2 consists of an IGBT or IGCT semiconductor unit.

Figure 2:
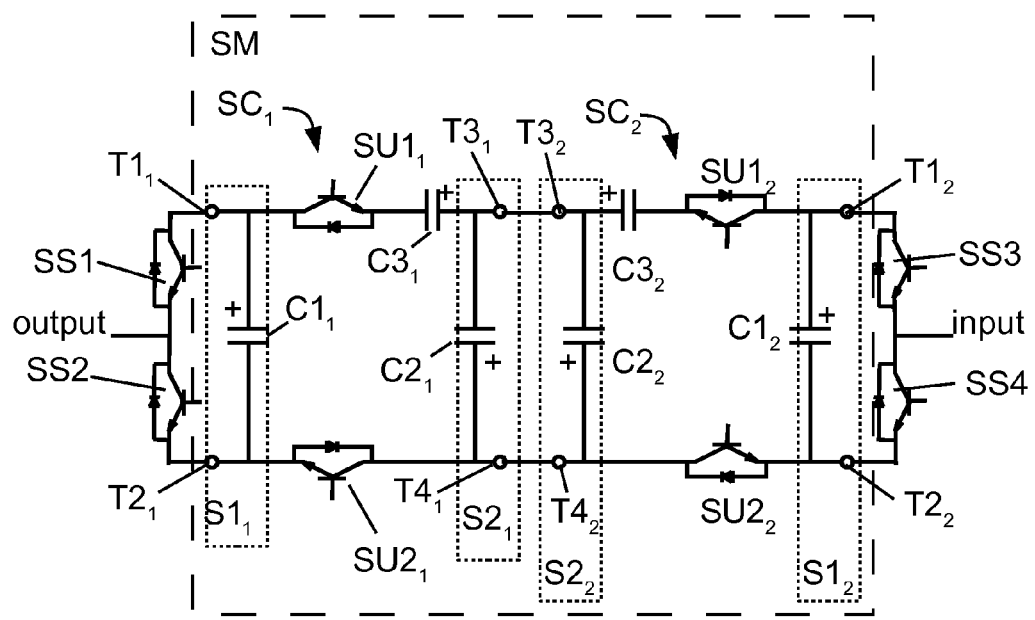
FIG. 2 illustrates a first embodiment of a switching module comprising two switching cells, each switching cell being equal to the switching cell of FIG. 1.
Figure 3:
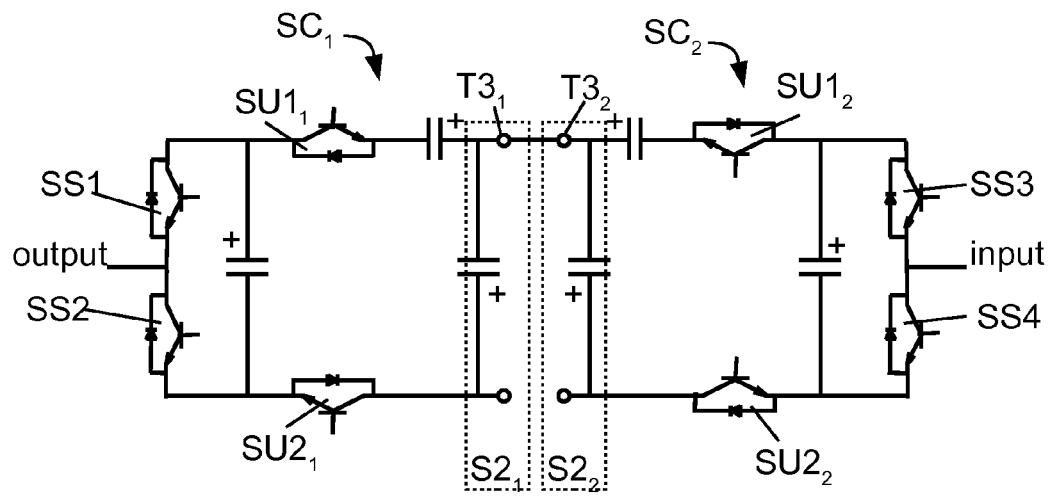
FIG. 3 illustrates a second embodiment of a switching module comprising two switching cells, each switching cell being equal to the switching cell of FIG. 1.
Figure 4:
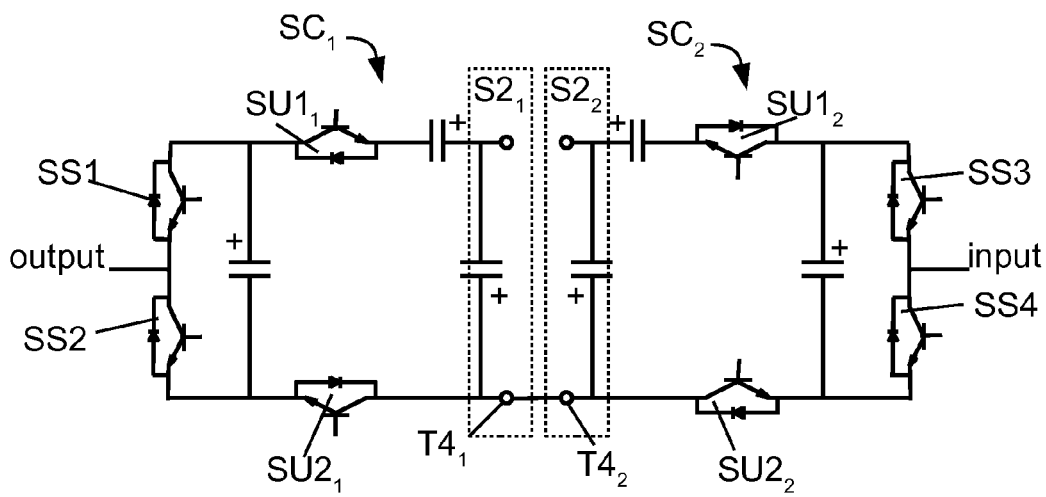
FIG. 4 illustrates a third embodiment of a switching module comprising two switching cells, each switching cell being equal to the switching cell of FIG. 1.

FIGS. 2, 3 and 4 shows embodiments wherein two switching cells $SC_1$, $SC_2$, each switching cell $SC_1$, $SC_2$ being equal to the switching cell SC of FIG. 1, are connected to each other in series by means of their respective second side $S2_1$, $S2_2$, so that the switching cells $SC_1$, $SC_2$ are connected in opposing electrical directions. In FIG. 2 the two switching cells $SC_1$, $SC_2$ are connected to each other through their third terminals $T3_1$, $T3_2$ as well as through their fourth terminals $T4_1$, $T4_2$. In FIG. 3 the two switching cells $SC_1$, $SC_2$ are connected to each other through only their third terminals $T3_1$, $T3_2$. In FIG. 4 the two switching cells $SC_1$, $SC_2$ are connected to each other through only their fourth terminals $T4_1$, $T4_2$. The first switching cell $SC_1$ of FIGS. 2-4 are equal, and the second switching cell $SC_2$ of FIGS. 2-4 are equal, whereas the switching modules SM differ by only the connections between the first switching cell $SC_1$ and second switching cell $SC_2$, connected by means of both third and fourth terminals in FIG. 2, connected by means of only the third terminals in FIG. 3, and by means of their fourth terminals in FIG. 4. Thus, FIGS. 2-4 illustrate three different embodiments of a switching module in accordance with the invention.

FIG. 2 illustrates a switching module SM comprising two serially connected switching cells $SC_1$, $SC_2$, wherein each switching cell $SC_1$, $SC_2$ is the same switching cell SC as is illustrated in FIG. 1. The switching cells $SC_1$, $SC_2$ are interconnected in opposite directions, and the second side $S2_1$ of the first switching cell $SC_1$ faces the second side $S2_2$ of the second switching cell $SC_2$. At the second sides $S2_1$, $S2_2$, the third terminal $T3_1$ of the first switching cells $SC_1$ is connected to the third terminal $T3_2$ of the second switching cell $SC_2$. Also at the second sides $S2_1$, $S2_2$, the fourth terminal $T4_1$ of the first switching cells $SC_1$ is connected to the fourth terminal $T4_2$ of the second switching cell $SC_2$. Two loops of three capacitor units $C1_1$, $C2_1$, $C3_1$ and $C1_2$, $C2_2$, $C3_2$, respectively are interconnected. The directions of the capacitor units $C1_1$, $C2_1$, $C3_1$ and $C1_2$, $C2_2$, $C3_2$ are the same as in FIG. 1.

The first side $S1_1$ of the first switching cell $SC_1$ is connected to a first switch SS1 and a second switch SS2 arranged in a half-bridge to the first terminal $T1_1$ and the second terminal $T2_1$, respectively. The first and second switch SS1, $SS2_1$ provides an output for the switching module SM. The first side $S1_2$ of the second switching cell $SC_2$ is connected to a third switch S3 and a fourth switch S4 arranged in a half-bridge to the first terminal $T1_2$ and the second terminal T22, respectively, of the second switching cell $SC_2$. The third switch SS3 and fourth switch SS4 provides an input for the switching module SM.

Each switching unit SS1, SS2, SS3 and SS4 of the input and output half-bridges comprises a semiconductor switch in anti-parallel configuration with a diode.

It should be noted that the second capacitor units $C2_1$, $C2_2$, can be exchanged for a single second capacitor unit C2 between the third terminals $T3_1$, $T3_2$ and the fourth terminals $T4_1$, $T4_2$ in an electrically equivalent circuit. In both cases, with one or two second capacitor units, the switching module SM can be provided as one unit for interconnection to further switching modules SM to provide a chain link of desired size. Alternatively, the switching cells $SC_1$, $SC_2$ can be provided as single units and used as building blocks for creating a chain link of switching cells $SC_1$, $SC_2$.

Each capacitor unit $C1_1$, $C2_1$, $C3_1$, $C1_2$, $C2_2$, and $C3_2$ provides the same voltage U volts in the directions illustrated in the FIG. 2, which directions are the same as in FIG. 1.

Each switching unit $SU1_1$, $SU2_1$, $SU1_2$, $SU2_2$, of the first switching cell $SC_1$ and of the second switching cell $SC_2$ has a reverse blocking voltage level of 3 U volts.

Each switching unit SS1, SS2, SS3, SS4 of the input and output half-bridges has a reverse blocking voltage level of U volts.

Table 1 illustrates a switching scheme for the switching module SM of FIG. 2, and the voltage output Vout.

The switching module SM of FIG. 2 with input and output switching units in half-bridges, and wherein the switching cells are connected by means of the third terminals and the fourth terminals, can provide nine output voltage levels, from −4 U to +4 U as indicated in Table 1.

TABLE 1

Switching combinations for desired output voltage levels for the switching module of FIG. 2.

| SS1 | SS2 | $SU1_1$ | $SU2_1$ | $SU1_2$ | $SU2_2$ | SS3 | SS4 | $V_{out}$ |
|---|---|---|---|---|---|---|---|---|
| 0 | 1 | 1 | 0 | 0 | 1 | 1 | 0 | −4U |
| 0 | 1 | 1 | 0 | 0 | 1 | 0 | 1 | −3U |
| 1 | 0 | 1 | 0 | 0 | 1 | 1 | 0 | −3U |
| 1 | 0 | 1 | 0 | 0 | 1 | 0 | 1 | −2U |
| 0 | 1 | 1 | 0 | 1 | 0 | 1 | 0 | −1U |
| 0 | 1 | 1 | 0 | 1 | 0 | 1 | 0 | −1U |
| 0 | 1 | 0 | 1 | 0 | 1 | 0 | 1 | 0 |
| 1 | 0 | 1 | 0 | 0 | 1 | 0 | 0 | 0 |
| 0 | 1 | 1 | 0 | 1 | 0 | 0 | 1 | 0 |

TABLE 1-continued

Switching combinations for desired output voltage levels for the switching module of FIG. 2.

| SS1 | SS2 | $SU1_1$ | $SU2_1$ | $SU1_2$ | $SU2_2$ | SS3 | SS4 | $V_{out}$ |
|---|---|---|---|---|---|---|---|---|
| 1 | 0 | 0 | 1 | 0 | 1 | 1 | 0 | 0 |
| 1 | 0 | 0 | 1 | 0 | 1 | 0 | 1 | +1U |
| 1 | 0 | 1 | 0 | 1 | 0 | 0 | 1 | +1U |
| 0 | 1 | 0 | 1 | 1 | 0 | 1 | 0 | +2U |
| 1 | 0 | 0 | 1 | 1 | 0 | 1 | 0 | +3U |
| 0 | 1 | 0 | 1 | 1 | 0 | 0 | 1 | +3U |
| 1 | 0 | 0 | 1 | 1 | 0 | 0 | 1 | +4U |
| 0 | 0 | 0 | 0 | 0 | 0 | 0 | 0 | Used for energyzation. |

FIG. 3 illustrates a switching module consisting of a first and a second switching cell $SC_1$, $SC_2$ connected to each other by means of their respective second sides $S2_1$, $S2_2$. In this embodiment, the switching cells $SC_1$, $SC_2$ are connected to each other only by means of their respective third terminals $T3_1$, $T3_2$. Thus, the fourth terminals $T4_1$, $T4_2$ are not used. As in FIG. 2, an input and an output of the switching module SM is provided at a respective first side $S1_1$, $S1_2$ of the first and second switching cell $SC_1$, $SC_2$.

Table 2 shows a switching scheme for the switching module SM of FIG. 3, and the voltage output Vout. Only a sub-set of the possible switching's is indicated in table 2, which sub-set show an example for each voltage level. The switching module SM of FIG. 3 also provides an output having nine voltage levels.

TABLE 2

Switching combinations for desired output voltage levels for the switching module of FIG. 3.

| SS1 | SS2 | $SU1_1$ | $SU2_1$ | $SU1_2$ | $SU2_2$ | SS3 | SS4 | Vout |
|---|---|---|---|---|---|---|---|---|
| 0 | 1 | 1 | 0 | 0 | 1 | 1 | 0 | −4U |
| 0 | 1 | 1 | 0 | 0 | 1 | 0 | 1 | −3U |
| 1 | 0 | 1 | 0 | 0 | 1 | 0 | 1 | −2U |
| 0 | 1 | 1 | 0 | 1 | 0 | 1 | 0 | −1U |
| 0 | 1 | 0 | 1 | 0 | 1 | 0 | 1 | 0 |
| 1 | 0 | 0 | 1 | 0 | 1 | 0 | 1 | +1U |
| 0 | 1 | 0 | 1 | 1 | 0 | 1 | 0 | +2U |
| 1 | 0 | 0 | 1 | 1 | 0 | 1 | 0 | +3U |
| 1 | 0 | 0 | 1 | 1 | 0 | 0 | 1 | +4U |
| 0 | 0 | 0 | 0 | 0 | 0 | 0 | 0 | Used for energization. |

Thus the chain link of FIG. 3 comprises one switching module SM and input and output half-bridges, which switching module provides 9 voltage levels. An advantage with the switching module of FIG. 3 compared to the switching module of FIG. 2 is that there is only one connection, i.e. by means of the third terminals $T3_1$, $T3_2$, between the switching cells $SC_1$, $SC_2$, which makes it easier to provide a bypass for bypassing a faulty switching cell.

FIG. 4 illustrates a switching module consisting of a first and a second switching cell $SC_1$, $SC_2$ connected to each other by means of their respective second sides $S2_1$, $S2_2$. In this embodiment, the switching cells $SC_1$, $SC_2$ are connected to each other only by means of their respective fourth terminals $T4_1$, $T4_2$. Thus, the third terminals $T3_1$, $T3_2$ are not used. As in FIGS. 2 and 3, an input and an output of the switching module SM is provided at a respective first side $S1_1$, $S1_2$ of the first and second switching cell $SC_1$, $SC_2$.

Table 3 shows a switching scheme for the switching module SM of FIG. 4, and the voltage output Vout. The same switching table 3 is valid also for the embodiment of FIG.

5. Only a sub-set of the possible switchings is indicated in table 2, which sub-set shows an example for each voltage level.

TABLE 3

Switching combinations for desired output voltage levels for the switching module of FIG. 4.

| SS1 | SS2 | SU1$_1$ | SU2$_1$ | SU1$_2$ | SU2$_2$ | SS3 | SS4 | Vout |
|---|---|---|---|---|---|---|---|---|
| 0 | 1 | 1 | 0 | 0 | 1 | 1 | 0 | −4U |
| 0 | 1 | 1 | 0 | 0 | 1 | 0 | 1 | −3U |
| 1 | 0 | 1 | 0 | 0 | 1 | 0 | 1 | −2U |
| 0 | 1 | 0 | 1 | 0 | 1 | 1 | 0 | −1U |
| 0 | 1 | 0 | 1 | 0 | 1 | 0 | 1 | 0 |
| 1 | 0 | 0 | 1 | 0 | 1 | 0 | 1 | +1U |
| 0 | 1 | 0 | 1 | 1 | 0 | 1 | 0 | +2U |
| 0 | 1 | 0 | 1 | 1 | 0 | 0 | 1 | +3U |
| 1 | 0 | 0 | 1 | 1 | 0 | 0 | 1 | +4U |
| 0 | 0 | 0 | 0 | 0 | 0 | 0 | 0 | Used for energization. |

Figure 5:
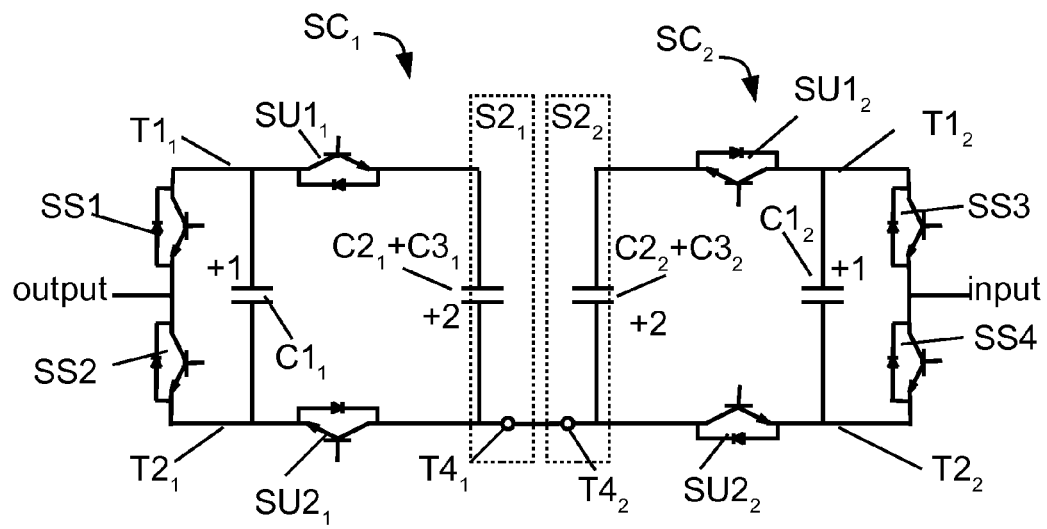
FIG. 5 illustrates an electrically equivalent circuit of the switching module in FIG. 4.

The chain link of FIG. 4, and FIG. 5, comprises one switching module SM and input and output half-bridges, which switching module provides 9 voltage levels. An advantage with the switching module of FIGS. 4 and 5 compared to the switching module of FIG. 2 is that there is only one connection, i.e. by means of the terminals T4$_1$, T4$_2$, between the switching cells SC$_1$, SC$_2$, which makes it easier to provide a bypass for bypassing a faulty switching cell.

FIG. 5 illustrates a switching module that is an electrically equivalent to the switching module of FIG. 4. In FIG. 4, for each switching cell SC$_1$, SC$_2$, the second capacitor unit C2$_1$, C2$_2$, is connected in series with the third capacitor unit C3$_1$, C3$_2$, i.e. the third terminal T3$_1$, T3$_2$ of each switching cell SC$_1$, SC$_2$ is not used in the embodiment of FIG. 4. In FIG. 5, the third terminals T3$_1$, T3$_2$ have been removed, since these are not used. In each switching cell SC$_1$, SC$_2$ of FIG. 5 the second capacitor unit C2$_1$, C2$_2$ and third capacitor unit C3$_1$, C3$_2$ has been exchanged with a single capacitor unit C2$_1$+C3$_1$, and C2$_2$+C3$_2$, respectively, which single capacitor unit (C2+C3) has twice the voltage level as the first capacitor unit C1.

Figure 6:
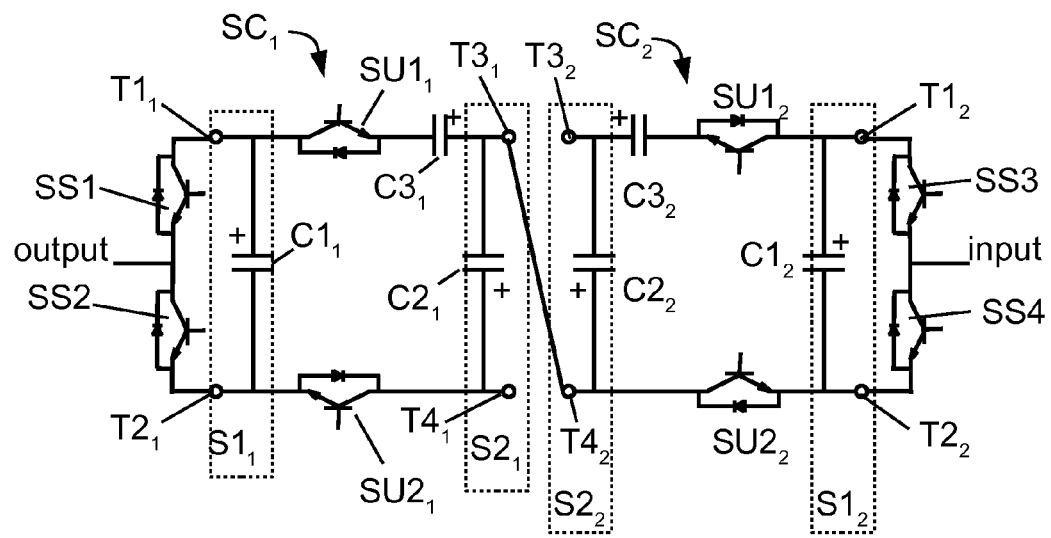
FIG. 6 illustrates a fourth embodiment of the switching module.

FIG. 6 illustrates an embodiment wherein the second side S2$_1$, S2$_2$ terminals connects the first switching cell SC$_1$ to the second switching cell SC$_2$ in a cross-wise fashion. Thus, the third terminal T3$_1$ of the first switching cell SC$_1$ is connected to the fourth terminal T4$_2$ of the second switching cell SC$_2$.

The fourth terminal T4$_1$ of the first switching cell SC$_1$ is not connected, and the third terminal T3$_2$ of the second switching cell SC$_2$ is not connected.

An alternative to the embodiment of FIG. 6 is to connect the switching cells SC1, SC2 in a cross-wise fashion by connecting the fourth terminal T4$_1$ of the first switching cell SC$_1$ and the third terminal T3$_2$ of the second switching cell SC$_2$, wherein the third terminal T3$_1$ of the first switching cell SC$_1$ and to the fourth terminal T4$_2$ of the second switching cell SC$_2$ is left un-connected.

FIGS. 7-11 illustrate a respective embodiment of a chain link, wherein a plurality of switching modules SM$_1$, SM$_2$, SM$_n$, are connected in series into the chain link. The switching modules SM$_1$, SM$_2$, SM$_n$ in one figure are equal to the other switching modules of that figure.

Figure 7:
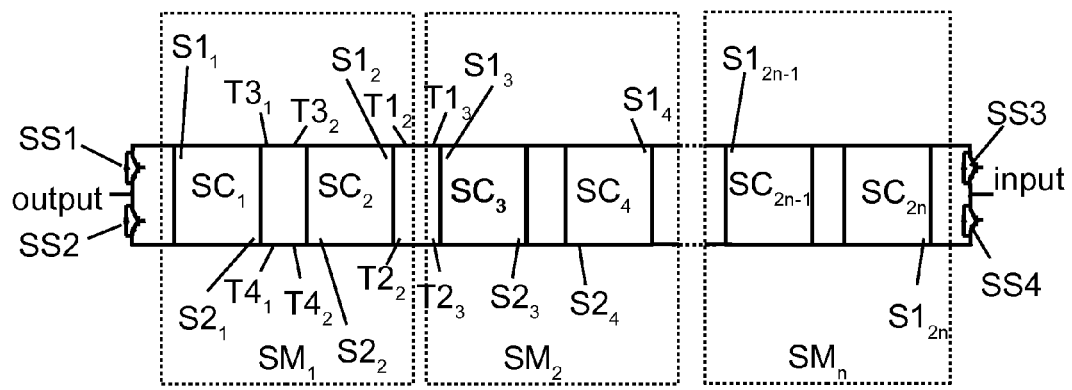
FIGS. 7-11 illustrate embodiments of a multilevel chain link for a converter comprising switching modules according to the invention.

Each one of the switching modules SM$_1$, SM$_2$, SMn of FIG. 7 is equal to the switching module SM illustrated in FIG. 2.

Figure 8:
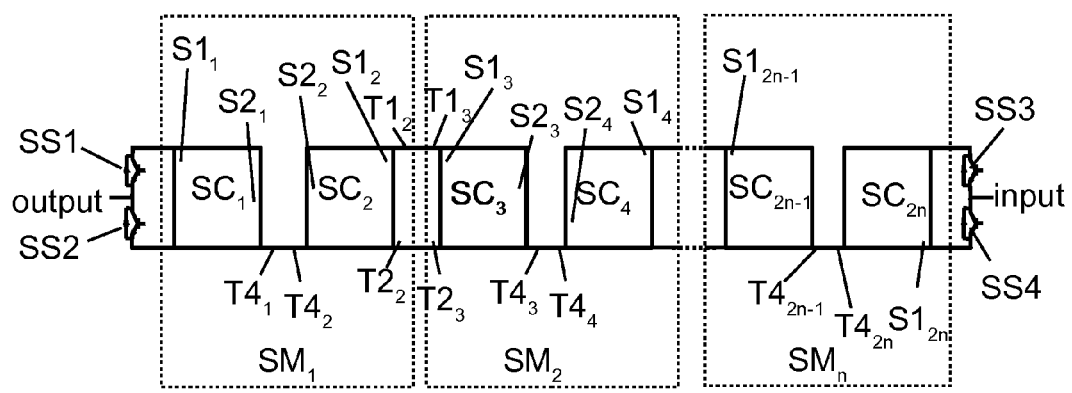

Each one of the switching modules SM$_1$, SM$_2$, SMn of FIG. 8 is equal to the switching module SM illustrated in FIG. 4 or to the switching module SM illustrated in FIG. 5.

Figure 9:
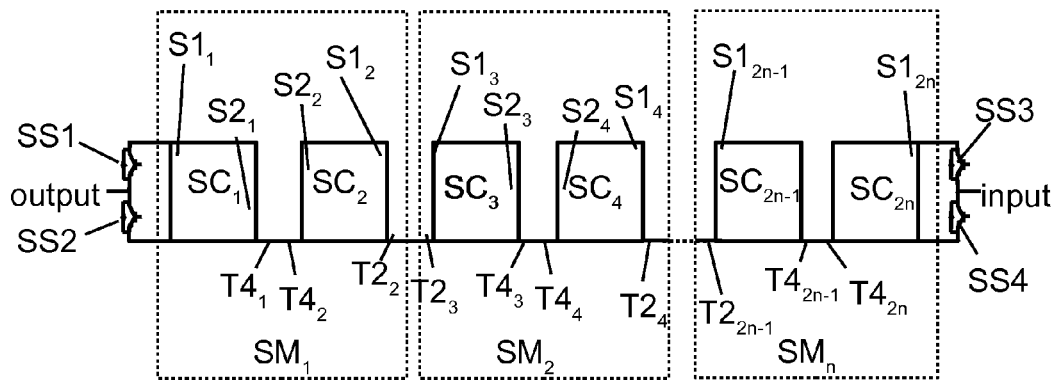

Also each one of the switching modules SM$_1$, SM$_2$, SMn of FIG. 9 is equal to the switching module SM illustrated in FIG. 4 or to the switching module SM illustrated in FIG. 5.

Figure 10:
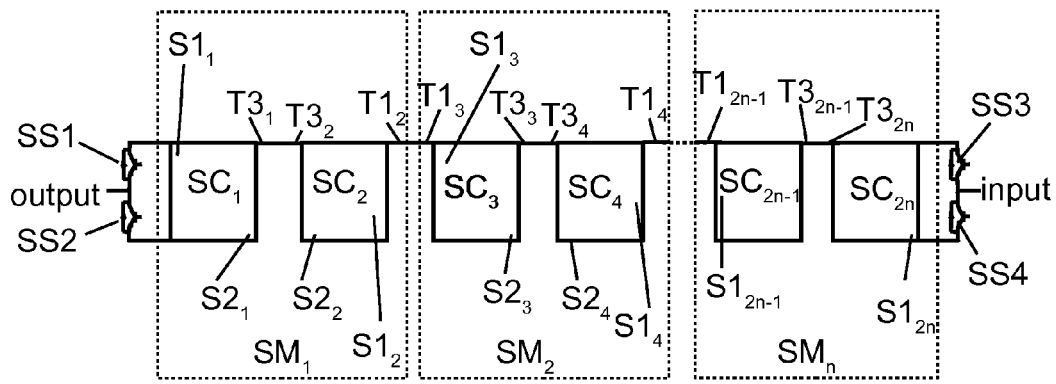

Each one of the switching modules SM$_1$, SM$_2$, SMn of FIG. 10 is equal to the switching module SM illustrated in FIG. 3.

Figure 11:
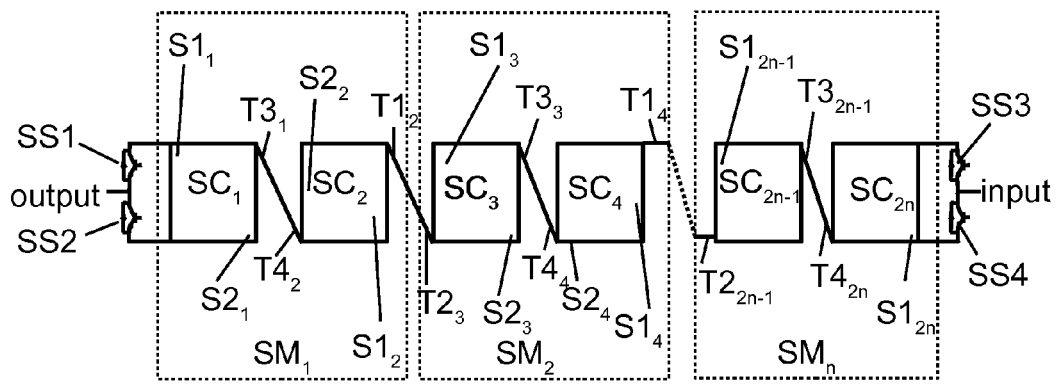
Figure 12:
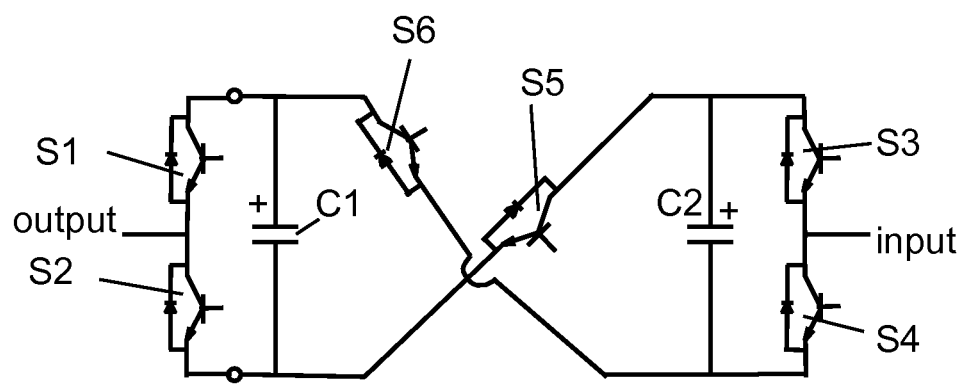
FIG. 12 illustrates a chain link of the prior art.

Each one of the switching modules SM$_1$, SM$_2$, SMn of FIG. 11 is equal to the switching module SM illustrated in FIG. 6.

Each switching module SM$_1$, SM$_2$, SM$_n$ comprises pair of oppositely connected switching cells, each pair comprising a first and a second switching cell SC$_1$ and SC$_2$, SC$_3$ and SC$_4$, SC$_{2n-1}$ and SC$_{2n}$, respectively. Each switching module SM$_1$, SM$_2$, ... SM$_n$ is connected to a neighboring switching module SM$_1$, SM$_2$, SM$_n$, by a first side of one of its switching cells (i.e. its second switching cell SC$_2$, SC$_4$), except for the last switching module SM$_n$ that is connected by its second switching cell to the input switching units SS3, SS4 by means of its first and second terminals, respectively, of its second switching cell SC$_{2n}$.

The first switching module SM$_1$ is connected to the output half-bridge at the other end of the chain link by means of its first side terminals T1$_1$, T2$_1$ of its first switching cell SC$_1$.

Every second switching cell SC$_2$, SC$_4$, SC$_{2n}$ of every switching module SM$_1$, SM$_2$, ..., SM$_n$ in the chain link in FIGS. 7-11 has its first side S1$_2$, S1$_4$, S1$_{2n}$ facing the input, and every first switching cell SC$_1$, SC$_3$, SC$_{2n-1}$ of every switching module SM$_1$, SM$_2$, SM$_n$ has its first side S1$_1$, S1$_3$, S1$_{2n-1}$ facing the output. For clarity, the expression "facing" should be understood as facing in the electrical direction.

Each one of the switching modules SM$_1$, SM$_2$, SMn of FIG. 7 is equal to the switching module SM illustrated in FIG. 2, wherein the first and second switching cells are interconnected by their third terminals and by their fourth terminals. Neighboring switching modules SM$_1$, SM$_2$, ..., SM$_n$ in the chain link of FIG. 7 are connected by two terminals. A first terminal to a first terminal, and a second terminal to a second terminal, so that each switching cell SC$_2$ to SC$_{2n-1}$, except for the first and last switching cell SC$_1$ and SC$_{2n}$, is connected on one side by its first and second terminals, to respective first and second terminals of a neighboring switching cell, and on the other side by its third and fourth terminals, to a respective third and fourth terminal of its other neighboring switching cell. The first switching cell SC$_1$ is connected by its first T1$_1$ and second terminal T2$_1$ to the switching units SS1, SS2 of the output half-bridge. The last switching cell SC$_{2n}$ is connected by its first and second terminals to the switching units SS3, SS4 of the input half-bridge.

Each one of the switching modules SM$_1$, SM$_2$, SMn of FIGS. 8 and 9 is equal to the switching module SM illustrated in FIG. 4, or its equivalent in FIG. 5, having internal connections by means of a respective fourth terminals of their respective first SC$_1$, SC$_3$, SC$_{2n-1}$ and second switching cell SC$_2$, SC$_4$, SC$_{2n}$.

In FIG. 8, consecutive switching modules, such as SM$_1$, and SM$_2$, are connected by means of a first terminal T1$_2$ to a first terminal T1$_3$, and a second terminal T2$_1$ to a second terminal T2$_3$.

In FIG. 9, consecutive switching modules, such as SM$_1$, and SM$_2$, are connected by means of only a second terminal T2$_1$ to a second terminal T2$_3$.

Thus consecutive switching cells SC$_1$-SC$_{2n}$ are connected in alternating fashion by a fourth terminal connection for every second switching cell interconnection, and a second terminal connection for every second switching cell interconnection.

In an alternative to FIG. 9 (not illustrated) consecutive switching modules of FIG. 4 or 5, are by means of only a first terminal (T1$_2$), to a first terminal (T1$_3$), instead of the illustrated second terminal T2$_1$ to a second terminal T2$_3$.

Each one of the switching modules SM$_1$, SM$_2$, SMn of FIG. 10 is equal to the switching module SM illustrated in FIG. 3, having internal connections by means of their third terminals T3$_1$, T3$_2$.

In FIG. 10, consecutive switching modules, such as SM$_1$, and SM$_2$, are connected by means of a first terminal T1$_2$ being connected to a first terminal T1$_3$. A not illustrated alternative for the switching module SM of FIG. 3 is a second terminal to a second terminal for the connection of neighboring switching modules SM$_1$, SM$_2$ of FIG. 10.

In FIG. 11, each one of the switching modules SM$_1$, SM$_2$, SMn is equal to the switching module SM illustrated in FIG. 6, having cross-wise internal connections by means of a third terminal T3$_1$ being connected to a fourth terminal T4$_2$. Consecutive switching modules SM$_1$, SM$_2$ are connected by a cross-wise interconnection wherein the first terminal T1$_2$ of the second switching cell SC$_2$ of the first switching module SM$_1$ is connected to the second terminal T2$_3$ of the first switching cell SC$_3$ of the second switching module SM$_2$.

A bypass can more easily be arranged for switching cells SC having only one single connection in its two sides, such as the switching cells in the chain links of FIGS. 9-11.

For the switching cells SC that have one single connection on one side and both terminals connected on its other side, such as the switching cells in the chain link of FIG. 8, a bypass may be arranged from single connection, such as the fourth terminal to fourth terminal (T4$_1$ to T4$_2$) connection in the first switching module SM$_1$, to the next single connection, such as the fourth terminal to fourth terminal (T4$_3$ to T4$_4$) connection in the second switching module SM$_2$.

Further Embodiments

The chain link has been described in embodiments, but can be generalized to comprise a number of, preferably an even number of, identical switching cells SC1, SC2, each in accordance with the switching cell of FIG. 1, the switching cells being arranged in series, wherein consecutive switching cells are connected in opposing directions, and wherein the switching cells are arranged in series between an input and an output. The first switching cell of the chain link being connected to two output switching units in a half-bridge connection at the output, the last switching cell to two input switching units in a half-bridge connection at the input. The connections between consecutive switching cells in the chain link are alternating between first sides to first sides, and second sides to second sides. The first side connections can be any of:

first terminal to first terminal only;
second terminal to second terminal only;
first terminal to second terminal only;
second terminal to first terminal only;
first terminal to first terminal, and second terminal to second terminal; and
first terminal to second terminal, and second terminal to first terminal.

The second side connections can be any of:
third terminal to third terminal only;
forth terminal to forth terminal only;
third terminal to forth terminal only;
forth terminal to third terminal only;
third terminal to third terminal, and forth terminal to forth terminal; and
third terminal to forth terminal, and forth terminal to third terminal.

A switching cell (SC$_1$, SC$_2$) for a chain link has thus been described, which switching cell (SC$_1$, SC$_2$) comprises a first side (S1) comprising a first terminal (T1) and a second terminal (T2), a second side (S2) comprising a third terminal (T3) and a fourth terminal (T4), a first switching unit (SU1), a second switching unit (SU2), and a first and a second capacitor unit (C1, C2). The first terminal (T1) is connected to the second terminal (T2) via the first capacitor unit (C1), wherein the first capacitor unit (C1) has its positive side facing the first terminal (T1). The third terminal (T3) is connected to the fourth terminal (T4) via the second capacitor unit (C2), wherein the second capacitor has its positive side facing the fourth terminal (T4). The second terminal (T2) is connected to the fourth terminal (T4) via the second switching unit (SU2). The switching cell also comprises a third capacitor unit (C3), and the first terminal (T1) is connected to the third terminal (T3) via a first series connection comprising the first switching unit (SU1) and the third capacitor unit (C3), wherein the third capacitor unit (C3) has its positive side facing the third terminal (T3).

A switching module (SM) comprises at least one such switching cell (SC$_1$, SC$_2$) has also been described in embodiments. Preferred embodiments of the switching module (SM) comprises at least two such switching cells (SC$_1$, SC$_2$), wherein the first switching cell (SC$_1$) and the second switching cell (SC$_2$) are connected in series in opposing directions, wherein the second side (S2$_1$) of the first switching cell (SC$_1$) is connected to the second side (S2$_2$) of the second switching cell (SC$_2$).

A chain link (CL) comprising a number of switching modules (SM$_1$, SM$_2$, ..., SM$_n$) in serial connection has also been described in embodiments. The invention is not limited to these embodiments, but may be varied within the scope of the claims.

The invention claimed is:

1. A switching module for a chain link comprising at least one switching cell, each switching cell comprising a first side comprising a first terminal and a second terminal, a second side comprising a third terminal and a fourth terminal, a first switching unit, a second switching unit, and a first capacitor unit, a second capacitor unit, and a third capacitor unit,
    wherein the first terminal is connected to the second terminal via the first capacitor unit, wherein the first capacitor unit has its positive side facing the first terminal,
    wherein the third terminal is connected to the fourth terminal via the second capacitor unit, wherein the second capacitor has its positive side facing the fourth terminal, and
    wherein the second terminal is connected to the fourth terminal via the second switching unit, and
    wherein the first terminal is connected to the third terminal via a first series connection comprising the first switching unit and the third capacitor unit, wherein the third capacitor unit has its positive side facing the third terminal.

2. The switching module according to claim 1, comprising at least two switching cells, wherein the first switching cell and a second switching cell are connected in series in opposing directions, wherein the second side of the first switching cell is connected to the second side of the second switching cell.

3. The switching module according to claim 2, wherein the first switching cell and the second switching cell are interconnected by only the fourth terminal of the first switching cell and the fourth terminal of the second switching cell.

4. The switching module according to claim 2, wherein the first switching cell and the second switching cell are interconnected only by the third terminal of the first switching cell and the third terminal of the second switching cell.

5. The switching module according to claim 2, wherein the first switching cell and the second switching cell are interconnected by the fourth terminal of the first switching cell and the fourth terminal of the second switching cell, and wherein the first switching cell and the second switching cell are also interconnected by the third terminal of the first switching cell and the third terminal of the second switching cell.

6. The switching module according to claim 2, wherein the first switching cell and the second switching cell are interconnected only by the third terminal of the first switching cell and the fourth terminal of the second switching cell.

7. A chain link for a multilevel converter, comprising:
an input having two switching units in a half-bridge configuration; and
an output comprising two switching units in a half-bridge configuration and a number of switching modules arranged in series between the input and the output,
wherein each of the number of switching modules is the switching module of claim 2.

8. The chain link according to claim 7, wherein the first switching cell and the second switching cell of each switching module are interconnected only by the fourth terminal of the first switching cell and the fourth terminal of the second switching cell.

9. The chain link according to claim 8, wherein every first switching module in every pair of consecutive switching modules is connected to the other switching module of the pair of consecutive switching modules only by the second terminal of the second switching cell of the first switching module being connected to the second terminal of the first switching cell of the other switching module.

10. The chain link according to claim 7, wherein the first switching cell and the second switching cell of each switching module are interconnected only by the third terminal of the first switching cell and the third terminal of the second switching cell.

11. The chain link according to claim 10, wherein every first switching module in every pair of consecutive switching modules is connected to the other switching module of the pair of consecutive switching modules only by the first terminal of the second switching cell of the first switching module being connected to the first terminal of the first switching cell of the other switching module.

12. The chain link according to claim 7, wherein the first switching cell and the second switching cell of each switching module are interconnected only by the third terminal of the first switching cell and the fourth terminal of the second switching cell.

13. The chain link according to claim 12, wherein every first switching module in every pair of consecutive switching modules is connected to the other switching module of the pair of consecutive switching modules only by the first terminal of the second switching cell of the first switching module being connected to the second terminal of the first switching cell of the other switching module.

14. The chain link according to claim 7, wherein the first switching cell and the second switching cell of each switching module are interconnected by:
the fourth terminal of the first switching cell and the fourth terminal of the second switching cell, and
the third terminal of the first switching cell and the third terminal of the second switching cell.

15. The chain link according to claim 14, wherein every first switching module in every pair of consecutive switching modules is connected to the other switching module of the pair of consecutive switching modules by:
the first terminal of the second switching cell of the first switching module being connected to the first terminal of the first switching cell of the other switching module, and
the second terminal of the second switching cell of the first switching module being connected to the second terminal of the first switching cell of the other switching module.

16. A switching module for a chain link comprising a first switching cell and a second switching cell,
each switching cell comprising:
a first side comprising a first terminal and a second terminal, a second side comprising a third terminal, a first switching unit, a second switching unit, and a first capacitor unit and a second capacitor unit,
wherein the first terminal is connected to the second terminal via the first capacitor unit, wherein the first capacitor unit has its positive side facing the first terminal,
wherein each switching cell comprises a third capacitor unit,
wherein the first terminal is connected to the third terminal via a first series connection comprising the first switching unit and the third capacitor unit, wherein the third capacitor unit has its positive side facing the third terminal,
wherein the second terminal is connected to the third terminal via the second switching unit and the second capacitor unit, wherein the second switching unit and the second capacitor unit are connected in a second series connection, and
wherein the first switching cell and the second switching cell are interconnected by the third terminal of the first switching cell and the third terminal of the second switching cell.

17. A switching module for a chain link comprising a first switching cell and a second switching cell,
each switching cell comprising:
a first side comprising a first terminal and a second terminal, a second side comprising a third terminal, a first switching unit, a second switching unit, and a first capacitor unit and a second capacitor unit,
wherein the first terminal is connected to the second terminal via the first capacitor unit, wherein the first capacitor unit has its positive side facing the first terminal,
wherein for each switching cell:
the second capacitor unit has its positive side facing the third terminal;
the second capacitor unit provides twice the voltage level as the first capacitor unit;
the first terminal is connected to the third terminal via a first series connection comprising the first switching unit and the second capacitor unit, wherein the second capacitor unit has its positive side facing the third terminal; and the second terminal is connected to the third terminal via the second switching unit, and wherein the switching module is further characterized by the connection of the switching cells wherein the first switching cell and the second switching cell are interconnected only by the third terminal of the first switching cell and the third terminal of the second switching cell.

18. A chain link for a multilevel converter, comprising:
an input having two switching units in a half-bridge configuration; and
an output comprising two switching units in a half-bridge configuration and a number of switching modules arranged in series between the input and the output,
wherein each switching module is the switching module of claim 17.

19. The chain link according to claim 18, wherein every first switching module in every pair of consecutive switching modules is connected to the other switching module of the pair of consecutive switching modules only by the second terminal of the second switching cell of the first switching module being connected to the second terminal of the first switching cell of the other switching module.

20. The chain link according to claim 18, wherein every first switching module in every pair of consecutive switching modules is connected to the other switching module of the pair of consecutive switching modules only by the first terminal of the second switching cell of the first switching module being connected to the first terminal of the first switching cell of the other switching module.

* * * * *